United States Patent
Fan

(10) Patent No.: US 8,203,646 B2
(45) Date of Patent: Jun. 19, 2012

(54) PORTABLE ELECTRONIC SYSTEM WITH A DETACHABLE CAMERA MODULE

(75) Inventor: Chin-Lung Fan, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 235 days.

(21) Appl. No.: 12/629,896

(22) Filed: Dec. 3, 2009

(65) Prior Publication Data

US 2011/0050910 A1 Mar. 3, 2011

(30) Foreign Application Priority Data

Aug. 25, 2009 (TW) .............................. 98128488 A

(51) Int. Cl.
*H04N 5/225* (2006.01)
(52) U.S. Cl. ..................................... 348/373; 348/207.1
(58) Field of Classification Search ............. 348/207.99, 348/373–376; 361/600
See application file for complete search history.

(56) References Cited

U.S. PATENT DOCUMENTS

| | | | | |
|---|---|---|---|---|
| 6,496,361 | B2* | 12/2002 | Kim et al. ................. | 361/679.55 |
| 6,922,212 | B2* | 7/2005 | Nakakubo et al. ............ | 348/373 |
| 7,466,542 | B2* | 12/2008 | Kuo et al. ................. | 361/679.55 |
| 7,742,100 | B2* | 6/2010 | Yoo et al. ....................... | 348/373 |
| 2005/0134727 | A1* | 6/2005 | Teramoto et al. ............. | 348/375 |
| 2006/0082454 | A1* | 4/2006 | Fukuda et al. ................. | 340/531 |
| 2006/0212635 | A1* | 9/2006 | Wenstrand et al. ........... | 710/303 |
| 2008/0117581 | A1* | 5/2008 | Kuo et al. ..................... | 361/683 |

FOREIGN PATENT DOCUMENTS

| | | |
|---|---|---|
| CN | 201000597 Y | 1/2008 |
| CN | 201044073 Y | 4/2008 |
| TW | 200708043 A | 2/2007 |
| TW | 200740351 A | 10/2007 |
| TW | 200823675 A | 6/2008 |
| TW | M356961 | 5/2009 |

OTHER PUBLICATIONS

Cheng-Hung Lin, Title of Invention: Computer With a Rotary Module Driven by Magnetic Forces, U.S. Appl. No. 12/349,526, filed Jan. 7, 2009.
Office action mailed on Feb. 7, 2012 for the Taiwan application No. 098128488, p. 1 line 6-14, p. 2, p. 3, p. 4, p. 5, p. 6, p. 7, p. 8, p. 9, p. 10 line 1-2.
Office action mailed on Feb. 21, 2012 for the China application No. 200910169865.X, p. 3, p. 4, p. 5, p. 6, p. 7.

* cited by examiner

*Primary Examiner* — David Ometz
*Assistant Examiner* — Ahmed A Berhan
(74) *Attorney, Agent, or Firm* — Winston Hsu; Scott Margo

(57) ABSTRACT

A camera module includes a casing, a camera unit installed inside the casing for capturing images, a signal transmission unit installed inside the casing and coupled to the camera unit for transmitting signals corresponding to the images captured by the camera unit to a graphic controller of a portable electronic device, a shooting button installed on the casing and coupled to the camera unit for actuating the camera unit to capture images, and a fixing mechanism for fixing the casing inside a slot on the portable electronic device in a detachable manner.

20 Claims, 6 Drawing Sheets

PORTABLE ELECTRONIC SYSTEM WITH A DETACHABLE CAMERA MODULE

BACKGROUND OF THE INVENTION

1. Field of the Invention

The present invention relates to a camera module and a related portable electronic system, and more particularly, to a detachable camera module and a related portable electronic system.

2. Description of the Prior Art

With the advanced internet, a video conference system is utilized widespread in an industry and distance learning. No matter where people are located in the world, they can utilize the video conference system to communicate effectively and conveniently. Therefore, a computer device with a built-in web cam is needed. However, due to structural limitation of the camera, the built-in camera only can capture images within a predetermined range. In order to overcome the drawback, a structural design disclosed in U.S. patent application Ser. No. 12/349,526 utilizes a magnetic force to drive a camera module to rotate, so as to switch the camera module to different positions. Though the structural design can switch the camera module to different view angles, application of the structural design is still limited when a user is out of the range of the view angle of the camera or when the user intends to capture images of other attendant in the video conference. Thus design of the camera module capable of capturing the images conveniently is an important issue in the electronic industry.

SUMMARY OF THE INVENTION

The present invention provides a detachable camera module and a related portable electronic system for solving above drawbacks.

According to the claimed invention, a camera module includes a casing, a camera unit installed inside the casing for capturing images, a signal transmission unit installed inside the casing and coupled to the camera unit for transmitting signals corresponding to the images captured by the camera unit to a graphic controller of a portable electronic device, a shooting button installed on the casing and coupled to the camera unit for actuating the camera unit to capture the images, and a fixing mechanism for fixing the casing inside a slot on the portable electronic device in a detachable manner.

According to the claimed invention, a portable electronic system includes a portable electronic device. The portable electronic device includes a housing whereon a slot is formed, and a graphic controller installed inside the housing for processing image signals. The portable electronic system further includes a camera module connected with the portable electronic device. The camera module includes a casing, a camera unit installed inside the casing for capturing images, a signal transmission unit installed inside the casing and coupled to the camera unit and the graphic controller for transmitting signals corresponding to the images captured by the camera unit to the graphic controller, a shooting button installed on the casing and coupled to the camera unit for actuating the camera unit to capture the images, and a fixing mechanism for fixing the casing inside the slot on the housing in a detachable manner.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
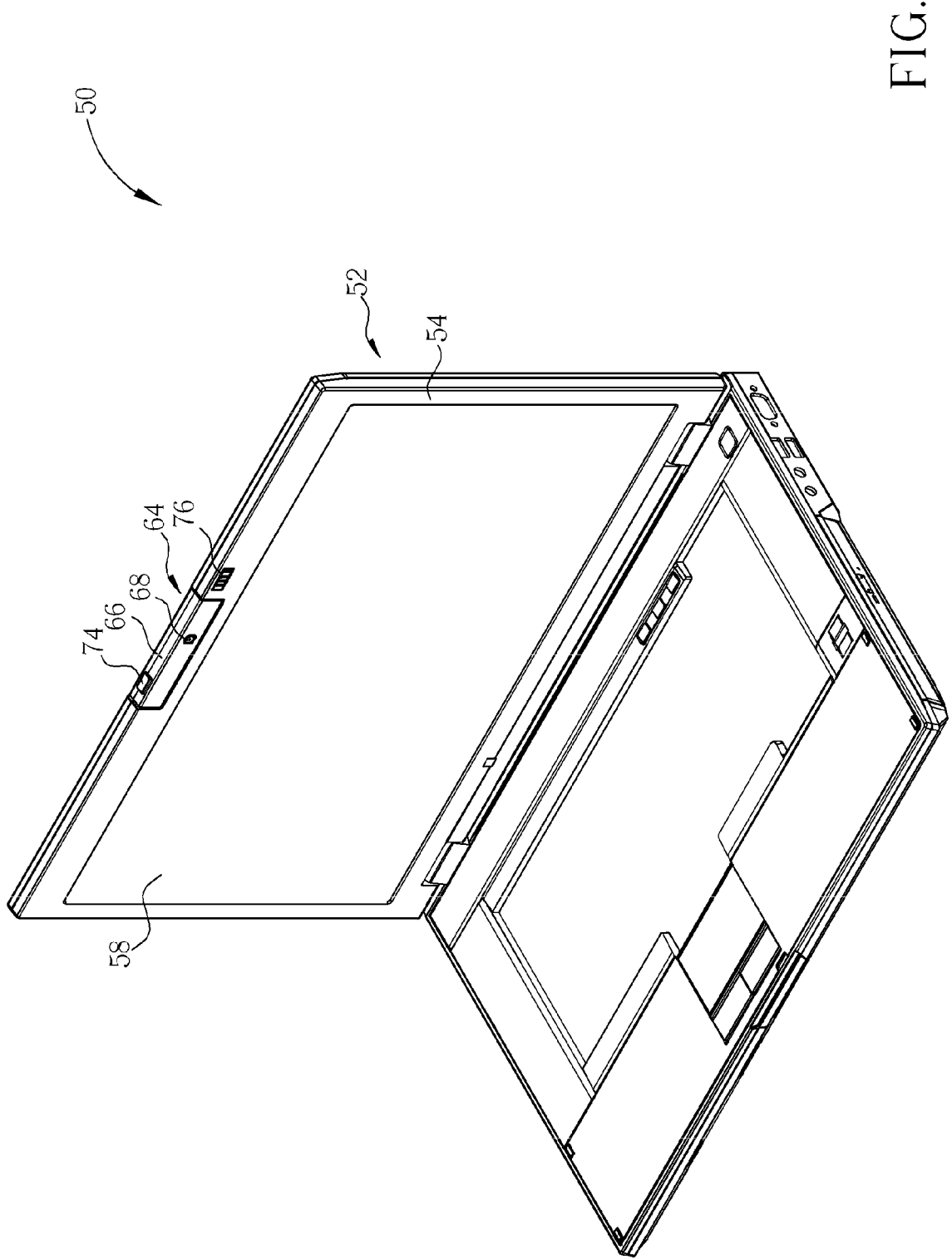
FIG. 1 is a schematic drawing of a portable electronic system having an image capturing function according to a preferred embodiment of the present invention.
Figure 2:
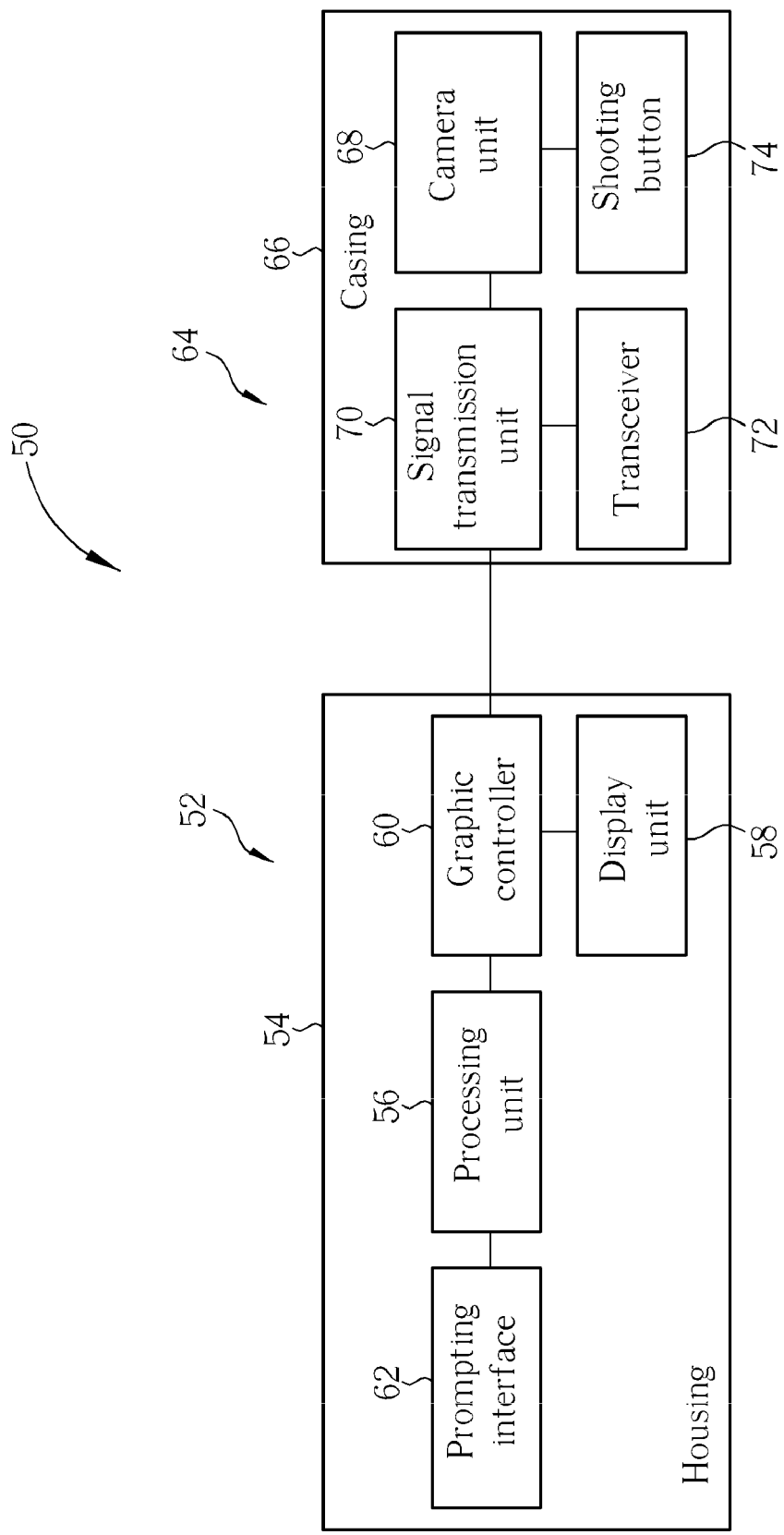
FIG. 2 is a functional block diagram of the portable electronic system according to the preferred embodiment of the present invention.

Please refer to FIG. 1 and FIG. 2. FIG. 1 is a schematic drawing of a portable electronic system 50 having an image capturing function according to a preferred embodiment of the present invention. FIG. 2 is a functional block diagram of the portable electronic system 50 according to the preferred embodiment of the present invention. The portable electronic system 50 includes a portable electronic device 52. The portable electronic device 52 can be a notebook computer. The portable electronic device 52 includes a housing 54 for covering internal components, a processing unit 56 installed inside the housing 54 for controlling operation of the portable electronic device 52, and a display unit 58 installed on the housing 54 for displaying image frames. The display unit 58 can be a liquid crystal display. The portable electronic device 52 further includes a graphic controller 60 installed inside the housing 54 and coupled to the processing unit 56 and the display unit 58 for processing image signals and for controlling the display unit 58 to display the corresponding image frames. The graphic controller 60 can be a graphic control chip. The portable electronic device 52 further includes a prompting interface 62. The processing unit 56 is for controlling the prompting interface 62 to show a prompt message. The prompting interface 62 can be a speaker, and the processing unit 56 is for controlling the speaker to sound a prompting voice message accordingly. For example, the speaker can sound a warning voice. The prompting interface 62 can further be a display. For example, the prompting interface 62 can be integrated with the display unit 58. The processing unit 56 is for controlling the display to show a prompting image message, such as a warning image frame.

The portable electronic system 50 further includes a camera module 64 connected with the portable electronic device 52. The camera module 64 includes a casing 66 connected to the portable electronic device 52 in a detachable manner, and a camera unit 68 installed inside the casing 66 for capturing images. The camera unit 68 can include optical components, such as a lens and so on. The camera module 64 further includes a signal transmission unit 70 installed inside the casing 66 and coupled to the camera unit 68 and the graphic controller 60 of the portable electronic device 52 for transmitting the signals corresponding to the images captured by the camera unit 68 to the graphic controller 60. The signal transmission unit 70 can be a wireless signal transmission unit for transmitting the signals corresponding to the images captured by the camera unit 68 to the graphic controller 60 of the portable electronic device 52 in a wireless communication manner, such as infrared ray communication, bluetooth communication, and so on. When the signal transmission unit 70 is the wireless signal transmission unit, the camera module 64 can further include a transceiver 72. The processing unit 56 of the portable electronic device 52 can control whether the prompting interface 62 shows the prompting message according to wireless signals transmitted from the transceiver 72. That is to say, when a distance between the camera module 64 and the portable electronic device 52 is larger than a predetermined range, the portable electronic device 52 can not receive the wireless signals transmitted from the transceiver 72, which means the portable electronic device 52 can detect whether the distance between the camera module 64 and the portable electronic device 52 is larger than the predetermined range via the wireless signals transmitted from the transceiver 72. In order to prevent the camera module 64 from losing or to avoid the camera module 64 unable to transmit the signals to the portable electronic device 52 effectively due to the exceeding distance between the camera module 64 and the portable electronic device 52, the processing unit 56 can control the prompting interface 62 to show the prompting message so as to warn the user to move the camera module 64 closer to the portable electronic device 52. In addition, the signal transmission unit 70 can further be a wire signal transmission unit for transmitting the signals to the graphic controller 60 of the portable electronic device 52 via a connecting cable, and the detailed description is introduced in following. The camera module 64 further includes a shooting button 74 installed on the casing 66 and coupled to the camera unit 68. When the user presses the shooting button 74, the shooting button 74 is for actuating the camera unit 68 to capture the images.

Figure 3:
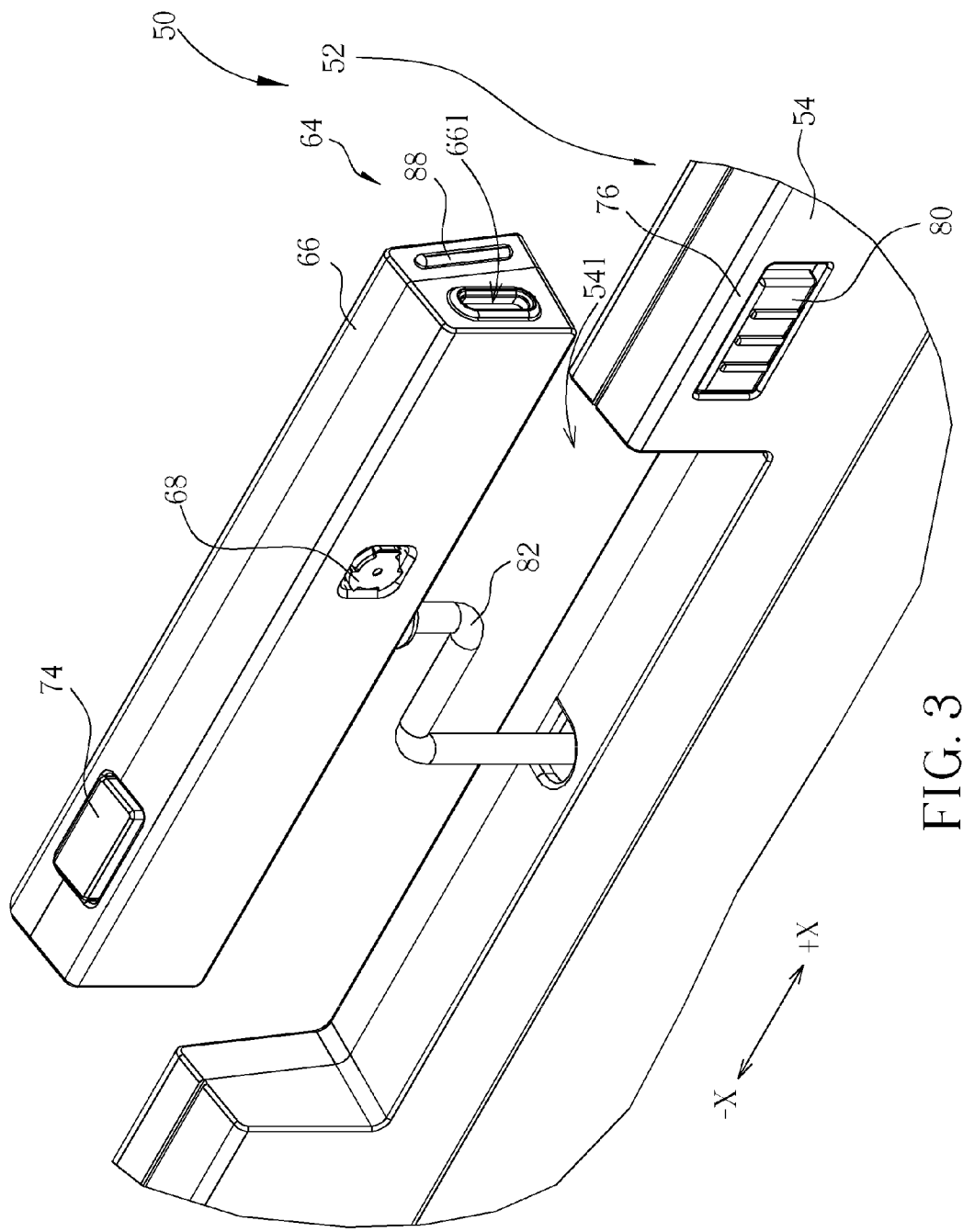
FIG. 3 is an enlarged diagram of a camera module detached from the portable electronic device according to the preferred embodiment of the present invention.
Figure 4:
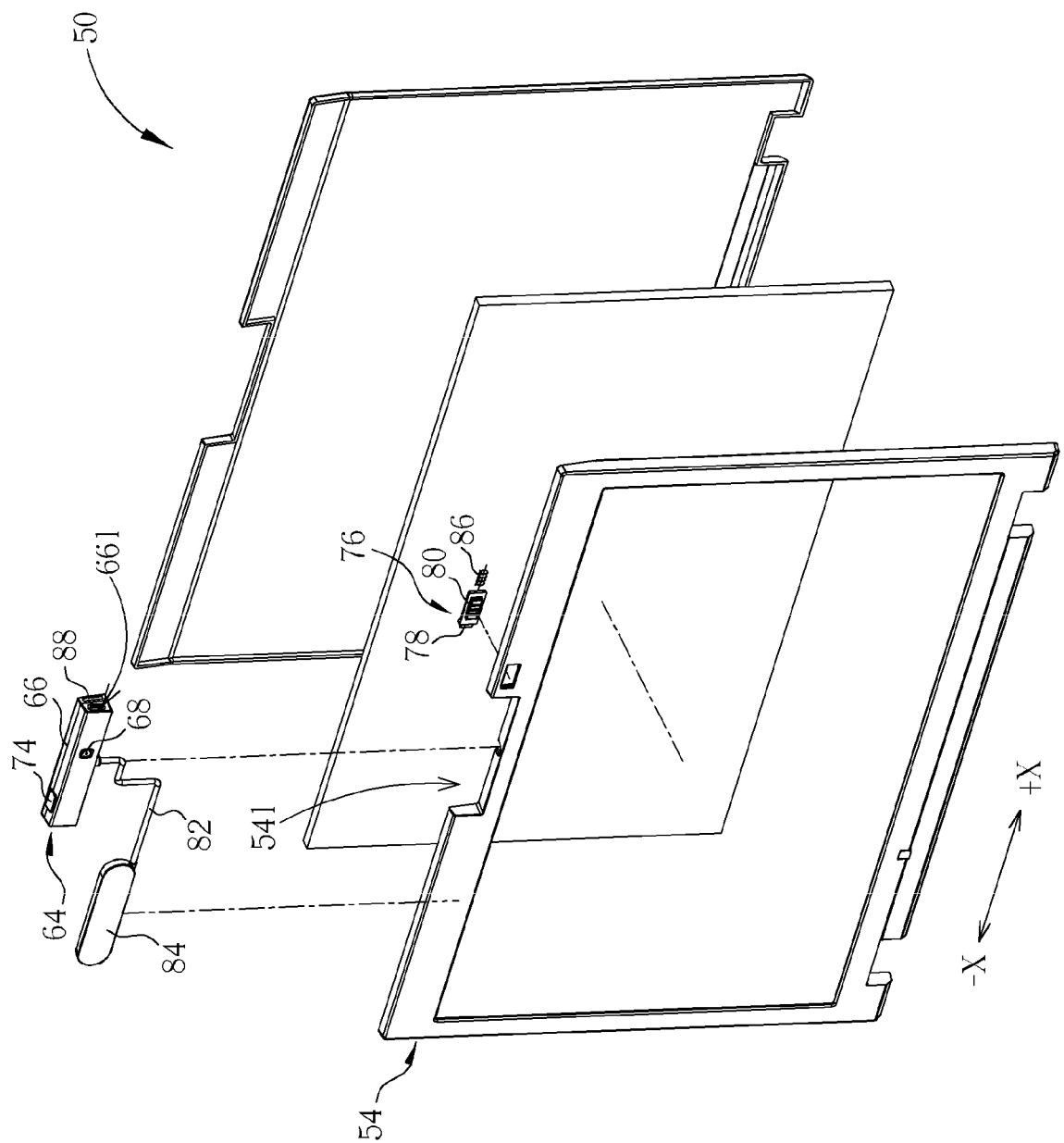
FIG. 4 is an exploded diagram of components of the portable electronic system according to the preferred embodiment of the present invention.
Figure 5:
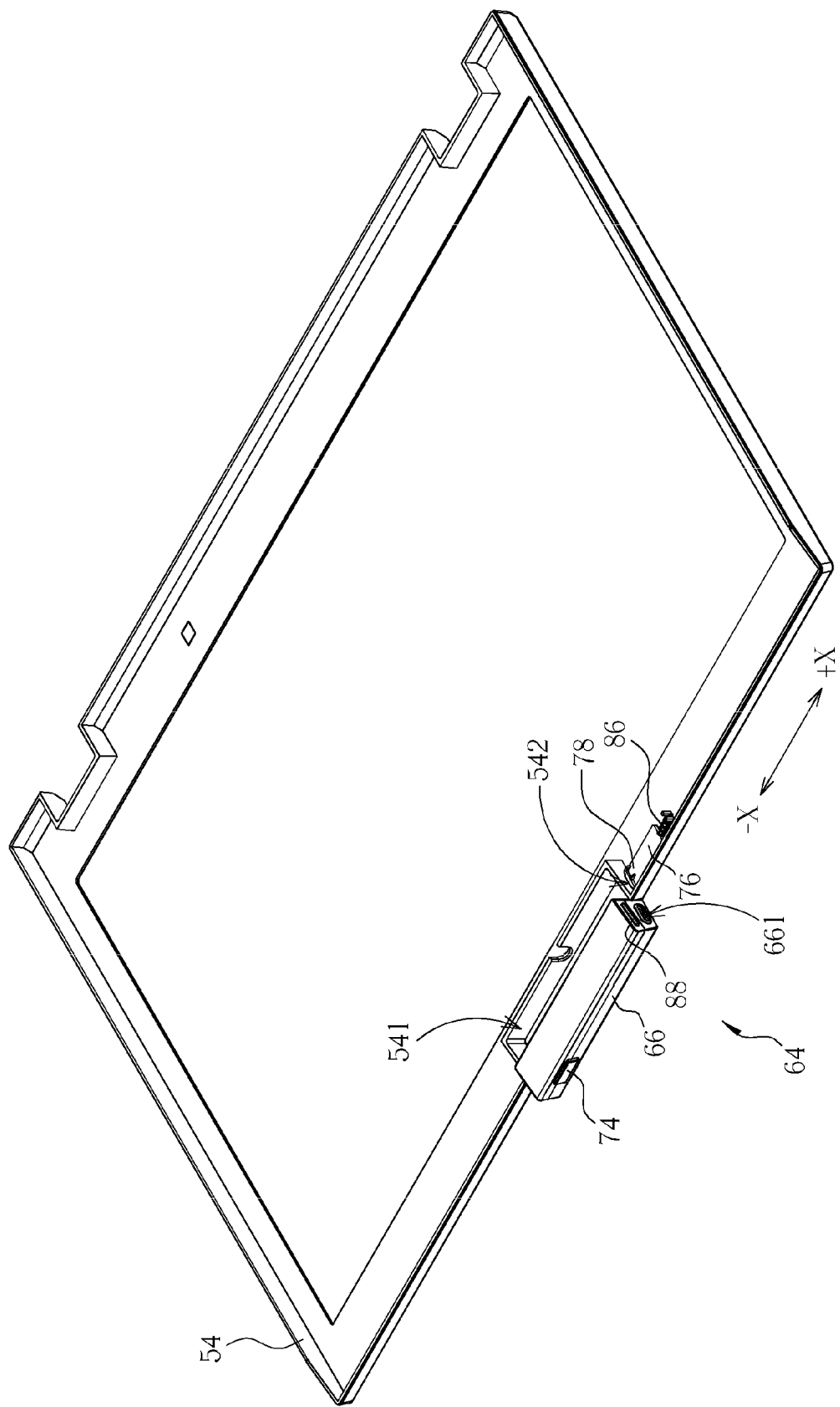
FIG. 5 is a diagram of inner structure of the camera module detached from the portable electronic device according to the preferred embodiment of the present invention.
Figure 6:
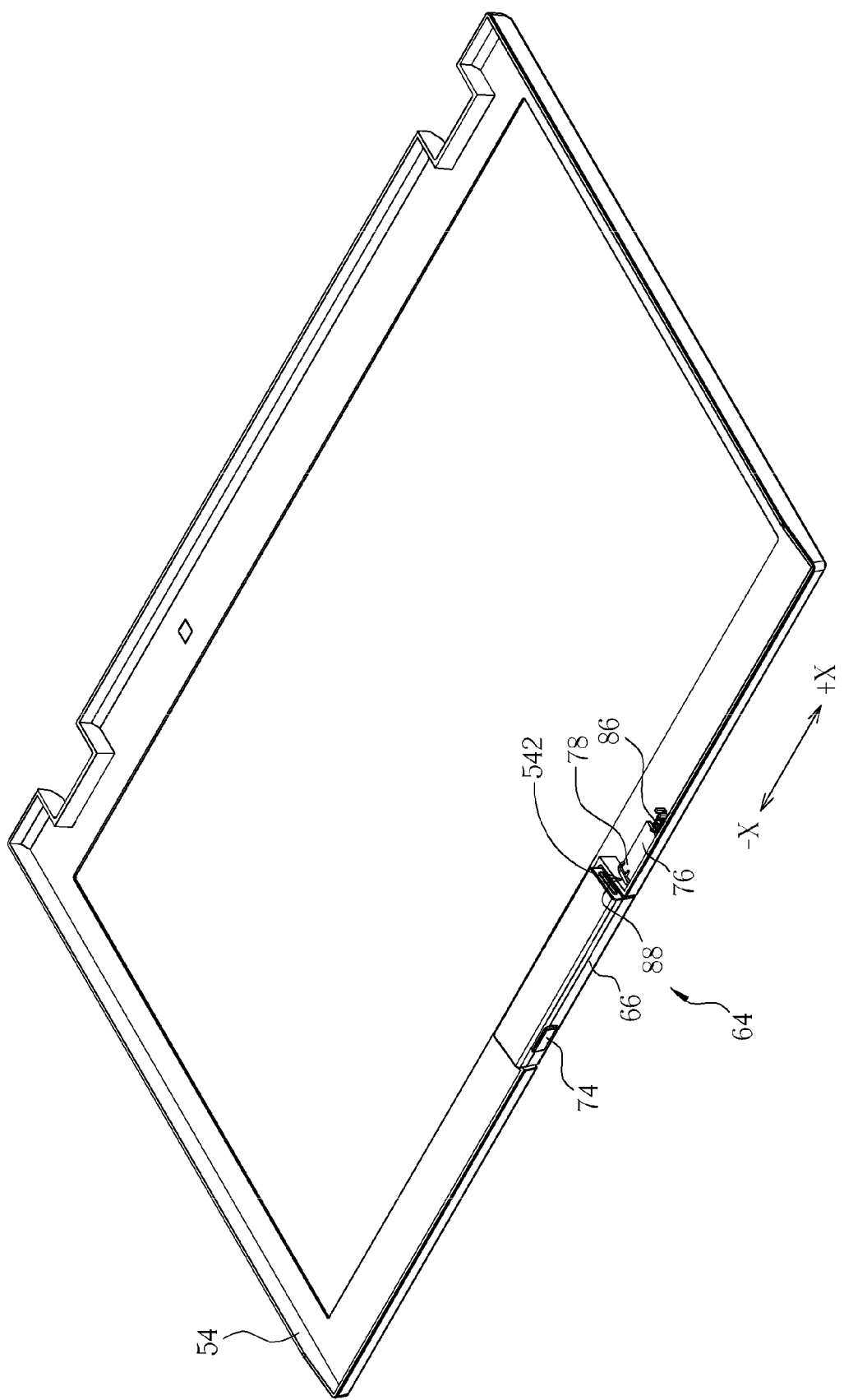
FIG. 6 is a diagram of inner structure of the camera module connected with the portable electronic device according to the preferred embodiment of the present invention.

Please refer to FIG. 1 to FIG. 6. FIG. 3 is an enlarged diagram of the camera module 64 detached from the portable electronic device 52 according to the preferred embodiment of the present invention. FIG. 4 is an exploded diagram of components of the portable electronic system 50 according to the preferred embodiment of the present invention. FIG. 5 is a diagram of inner structure of the camera module 64 detached from the portable electronic device 52 according to the preferred embodiment of the present invention. FIG. 6 is a diagram of inner structure of the camera module 64 connected with the portable electronic device 52 according to the preferred embodiment of the present invention. A slot 541 is formed on the housing 54 of the portable electronic device 52. The camera module 64 further includes a fixing mechanism 76 for fixing the casing 66 inside the slot 541 on the housing 52 in a detachable manner. A sunken part 661 is formed on the casing 66 of the camera module 64, and an opening 542 is formed on the housing 54 of the portable electronic device 52 located in a position corresponding to the sunken part 661. The fixing mechanism 76 includes a wedging component 78 installed inside the housing 54 in a slidable manner for passing through the opening 542 and wedging inside the sunken part 661 on the casing 66 so as to fix the casing 66 inside the slot 541 on the portable electronic device 52. The fixing mechanism 76 further includes a button 80 installed on the housing 54 and connected to the wedging component 78. The user can push the button 80 so as to drive the wedging component to move in +X direction, so that the wedging component 78 can be disassembled from the sunken part 661 on the casing 66 and the casing 66 can be disassembled from the slot 541 on the housing 54. Therefore, the user can take the camera module 64 away from the portable electronic device 52 for broadening capturing ranges of the camera unit 68. The camera module 64 can further be utilized as a digital camera. For example, the images captured by the camera unit 68 can be transmitted to the graphic controller 60 of the portable electronic device 52 via the signal transmission unit 70, and then the display unit 58 displays the images captured by the camera unit 68. When the user previews the intended images via the display unit 58, the user can presses the shooting button 74 to actuate the camera unit 68 to capture the images at that moment. The images captured by the camera unit 68 can be transmitted to the graphic controller 60 of the portable electronic device 52 via the signal transmission unit 70 so as to execute image processing for the captured images or to show the captured images on the display unit 58.

As shown in FIG. 3 and FIG. 4, when the signal transmission unit 70 is a wire signal transmission unit, the camera module 64 can further include a connecting cable 82 connected to the signal transmission unit 70 and the portable electronic device 52 so as to transmit the signals from the signal transmission unit 70 to the graphic controller 60 of the portable electronic device 52. In addition, the portable electronic system 50 can further include an auto-reeling mechanism 84 installed inside the housing 54 of the portable electronic device 52 and connected to the connecting cable 82 for reeling the connecting cable 82 automatically, so that the connecting cable 82 can be reeled into the housing 54 of the portable electronic device 52 conveniently. The fixing mechanism 76 further includes an elastic component 86 installed inside the housing 54 and connected to an end of the wedging component 78. The elastic component 86 can be a spring. When the user intends to fix the casing 66 of the camera module 64 inside the slot 541 on the housing 54, the user can push the button 80 to drive the wedging component 78 to move in +X direction first, so as to prevent the wedging component 78 from interfering with the casing 66. Meanwhile, the elastic component 86 connected to the wedging component 78 is compressed. Then, the casing 66 is installed inside the slot 541 on the housing 54, and the button 80 is released. The elastic component 86 connected to the wedging component 78 is not compressed and can provide a resilient force to the wedging component 78 so as to drive the wedging component 78 to move in −X direction opposite to +X direction, so that the wedging component 78 passes through the opening 542 and wedges inside the sunken part 661 on the casing 66, and the casing 66 can be fixed inside the slot 541 on the housing 54. In addition, a cushion 88 can be disposed on the casing 66 of the camera module 64 for fixing the casing 66 inside the slot 541 on the housing 54 tightly and for preventing abrasion between the casing 66 and the housing 54. The cushion 88 can be made of soft material, such as rubber.

Comparing to the prior art, the detachable camera module of the present invention can broaden the capturing ranges of the camera unit effectively and improve limitation of view angles of the conventional camera module. In addition, the camera module of the present invention can be utilized as the digital camera, and then transmits the captured images to the portable electronic device. Thus, the detachable camera module of the present invention is an innovative design for capturing the images conveniently.

Those skilled in the art will readily observe that numerous modifications and alterations of the device and method may be made while retaining the teachings of the invention.

What is claimed is:

1. A camera module comprising:
   a casing, a sunken part being formed on the casing;
   a camera unit installed inside the casing for capturing images;
   a signal transmission unit installed inside the casing and coupled to the camera unit for transmitting signals corresponding to the images captured by the camera unit to a graphic controller of a portable electronic device;
   a shooting button installed on the casing and coupled to the camera unit for actuating the camera unit to capture the images; and
   a fixing mechanism for fixing the casing inside a slot on the portable electronic device in a detachable manner, the fixing mechanism comprising:
      a wedging component installed inside a housing of the portable electronic device in a slidable manner for wedging inside the sunken part on the casing so as to fix the casing inside the slot on the portable electronic device; and
      a button installed on the housing of the portable electronic device in a slidable manner and connected to the wedging component for driving the wedging component.

2. The camera module of claim 1, wherein the fixing mechanism further comprises an elastic component installed inside the housing of the portable electronic device and connected to an end of the wedging component for providing a resilient force to the wedging component so that the wedging component wedges inside the sunken part on the casing.

3. The camera module of claim 1, wherein a cushion is disposed on the casing for fixing the casing inside the slot on the portable electronic device tightly.

4. The camera module of claim 1, wherein the signal transmission unit is a wire signal transmission unit, and the camera module further comprises a connecting cable connected to the wire signal transmission unit so as to transmit the signals to the graphic controller of the portable electronic device.

5. The camera module of claim 4 further comprising:
   an auto-reeling mechanism installed the portable electronic device and connected to the connecting cable for reeling the connecting cable automatically.

6. The camera module of claim 1, wherein the signal transmission unit is a wireless signal transmission unit for transmitting the signals corresponding to the images captured by the camera unit to the graphic controller of the portable electronic device in a wireless communication manner.

7. A portable electronic system comprising:
   a portable electronic device comprising:
      a housing whereon a slot is formed; and
      a graphic controller installed inside the housing for processing image signals; and
   a camera module connected with the portable electronic device, the camera module comprising:
      a casing, a sunken part being formed on the casing, and an opening being formed on the housing located in a position corresponding to the sunken part;
      a camera unit installed inside the casing for capturing images;
      a signal transmission unit installed inside the casing and coupled to the camera unit and the graphic controller for transmitting signals corresponding to the images captured by the camera unit to the graphic controller;
      a shooting button installed on the casing and coupled to the camera unit for actuating the camera unit to capture the images; and
      a fixing mechanism for fixing the casing inside the slot on the housing in a detachable manner, the fixing mechanism comprising:
         a wedging component installed inside the housing in a slidable manner for passing through the opening and wedging inside the sunken part on the casing so as to fix the casing inside the slot on the housing; and
         a button installed on the housing of the portable electronic device and connected to the wedging component for driving the wedging component.

8. The portable electronic system of claim 7, wherein the fixing mechanism further comprises an elastic component installed inside the housing and connected to an end of the wedging component for providing a resilient force to the wedging component so that the wedging component wedges inside the sunken part on the casing.

9. The portable electronic system of claim 7, wherein a cushion is disposed on the casing for fixing the casing inside the slot on the housing tightly.

10. The portable electronic system of claim 7, wherein the signal transmission unit is a wire signal transmission unit, and the camera module further comprises a connecting cable connected to the wire signal transmission unit so as to transmit the signals to the graphic controller of the portable electronic device.

11. The portable electronic system of claim 10 further comprising:
    an auto-reeling mechanism installed inside the housing and connected to the connecting cable for reeling the connecting cable automatically.

12. The portable electronic system of claim 7, wherein the signal transmission unit is a wireless signal transmission unit for transmitting the signals corresponding to the images captured by the camera unit to the graphic controller of the portable electronic device in a wireless communication manner.

13. The portable electronic system of claim 12, wherein the portable electronic device further comprises a prompting interface, and a processing unit for controlling the prompting interface to show a prompting message when a distance between the camera module and the portable electronic device is larger than a predetermined range.

14. The portable electronic system of claim 13, wherein the camera module further comprises a transceiver, the processing unit is for controlling whether the prompting interface shows the prompting message according to a wireless signal transmitted from the transceiver.

15. A portable electronic system comprising:
    a portable electronic device comprising:
       a housing whereon a slot is formed; and
       a graphic controller installed inside the housing for processing image signals; and
    a camera module connected with the portable electronic device, the camera module comprising:
       a casing;
       a camera unit installed inside the casing for capturing images;
       a signal transmission unit installed inside the casing and coupled to the camera unit and the graphic controller for transmitting signals corresponding to the images captured by the camera unit to the graphic controller, the signal transmission unit being a wire signal transmission unit;
       a connecting cable connected to the signal transmission unit for transmitting the signals corresponding to the images captured by the camera unit from the signal transmission unit to the graphic controller;

a shooting button installed on the casing and coupled to the camera unit for actuating the camera unit to capture the images; and a fixing mechanism for fixing the casing inside the slot on the housing in a detachable manner; and an auto-reeling mechanism installed inside the housing and connected to the connecting cable for reeling the connecting cable automatically.

16. The portable electronic system of claim 15, wherein a sunken part is formed on the casing, an opening is formed on the housing located in a position corresponding to the sunken part, and the fixing mechanism comprises:

a wedging component installed inside the housing in a slidable manner for passing through the opening and wedging inside the sunken part on the casing so as to fix the casing inside the slot on the portable electronic device; and a button installed on the housing of the portable electronic device and connected to the wedging component for driving the wedging component.

17. The portable electronic system of claim 16, wherein the fixing mechanism further comprises an elastic component installed inside the housing and connected to an end of the wedging component for providing a resilient force to the wedging component so that the wedging component wedges inside the sunken part on the casing.

18. The portable electronic system of claim 15, wherein a cushion is disposed on the casing for fixing the casing inside the slot on the housing tightly.

19. The portable electronic system of claim 15, wherein the signal transmission unit is a wireless signal transmission unit for transmitting the signals corresponding to the images captured by the camera unit to the graphic controller of the portable electronic device in a wireless communication manner.

20. The portable electronic system of claim 19, wherein the portable electronic device further comprises a prompting interface, and a processing unit for controlling the prompting interface to show a prompting message when a distance between the camera module and the portable electronic device is larger than a predetermined range.

* * * * *